United States Patent
Tamburro, Jr.

[19]

[11] Patent Number: 5,878,775
[45] Date of Patent: Mar. 9, 1999

[54] TOILET VALVE ASSEMBLY

[76] Inventor: Louis Tamburro, Jr., 1144 Galahad Dr., Casselberry, Fla. 32707

[21] Appl. No.: 963,111

[22] Filed: Nov. 3, 1997

[51] Int. Cl.$^6$ ............................ F16K 31/20; F16K 33/00; F16K 43/00

[52] U.S. Cl. ..................... 137/329.3; 137/315; 137/400; 137/426; 137/446; 137/449

[58] Field of Search ..................... 137/426, 434, 137/437, 446, 449, 315, 329.1, 329.2, 329.3, 400

[56] References Cited

U.S. PATENT DOCUMENTS

| | | | |
|---|---|---|---|
| Re. 30,427 | 11/1980 | Brown et al. | 137/446 |
| 670,818 | 3/1901 | Smith | 137/446 |
| 988,575 | 4/1911 | Joyce | 137/329.3 |
| 999,608 | 8/1911 | Stucky | 137/329.3 |
| 1,044,311 | 11/1912 | Wall | 137/449 |
| 1,476,029 | 12/1923 | Black | 137/446 |
| 1,702,580 | 2/1929 | Thaete | 137/329.3 |
| 2,375,406 | 5/1945 | Drown | 136/178 |
| 2,683,462 | 7/1954 | Mutti | 137/449 |
| 2,716,422 | 8/1955 | Whitlock, Jr. | 137/391 |
| 2,737,968 | 3/1956 | Lang | 137/449 |
| 2,756,769 | 7/1956 | Martin et al. | 137/416 |
| 2,814,305 | 11/1957 | Sturman | 137/441 |
| 2,935,081 | 5/1960 | Kryzer | 137/391 |
| 3,024,799 | 3/1962 | Flieder | 137/207 |
| 3,110,036 | 11/1963 | Downin | 137/446 |
| 3,185,302 | 5/1965 | Kryzer | 137/426 |
| 4,182,364 | 1/1980 | Gilbert et al. | 137/437 |
| 4,312,083 | 1/1982 | Imler | 4/366 |
| 4,335,741 | 6/1982 | Nasser | 137/441 |
| 4,420,845 | 12/1983 | Antunez | 137/441 |
| 4,461,453 | 7/1984 | Wilson | 251/251 |
| 4,842,011 | 6/1989 | Roosa | 137/414 |
| 4,945,944 | 8/1990 | Chen | 137/414 |
| 5,255,703 | 10/1993 | Johnson | 137/414 |
| 5,715,859 | 2/1998 | Nichols-Roy | 137/414 |

FOREIGN PATENT DOCUMENTS

| | | | |
|---|---|---|---|
| 77774 | 2/1935 | France | 137/434 |
| 1059 | 8/1888 | United Kingdom | 137/449 |
| 517734 | 2/1940 | United Kingdom | 137/400 |

*Primary Examiner*—George L. Walton
*Attorney, Agent, or Firm*—William M. Hobby, III

[57] ABSTRACT

A toilet having a water inlet valve apparatus has a flush tank with a water inlet tube connecting from a water source into the flush tank. A water cutoff is attached to the water inlet tube and has a valve seat in a floating valve element positioned in the water inlet tube to seat in the valve seat responsive to water in the water inlet tube so that the water is cut off from entering the toilet tank when the valve element is seated in the valve seat. A removably attached ballcock valve assembly is removably attached to the water cutoff valve and water inlet tube and has a valve opening member positioned to hold the floating valve element in the water cutoff valve from the valve seat when the ballcock valve is attached to the water cutoff valve. Removing the ballcock valve from the water cutoff valve closes the water cutoff valve and stops the flow of water into the tank from the water inlet tube. The ballcock valve includes a floating valve element mounted in the valve body beneath a valve seat so that water from the inlet valve pushes the floating valve element into the valve seat to cut off the water entering the flush tank. A float is mounted to a pair of movable arms which are connected to a cam positioned over the valve seat of the ballcock valve assembly such that the falling float will rotate the cam to push the floating valve element off the valve seat to allow the filling of the flush tank.

13 Claims, 2 Drawing Sheets

TOILET VALVE ASSEMBLY

BACKGROUND OF THE INVENTION

The present invention relates to a water inlet valve for a toilet and especially to a water inlet valve having a pair of valve seats each with a floating valve element for filling a toilet flush tank.

The standard design for flush tanks has been utilized for a great many years and includes an inlet pipe for a valve, a float supported on a lever arm which opens and closes the inlet valve, an overflow pipe to prevent overrunning of the flush tank, a flush valve which seats on a bottom outlet under pressure of the water head in the tank, and a hand lever connected to the flush valve for lifting the flush valve to break the water head pressure to permit it to float freely until the tank has been emptied. Once the tank is emptied, the flush valve closes again and the tank refills by the dropping of the inlet valve controlling float. The conventional ballcock valve used in the inlet pipe is constructed such that, if the water level in the tank recedes or moves downwardly, the float also moves downwardly. An arm secured to the float operates a valve mechanism in the inlet tube or pipe so that as the float moves downwardly, the valve is gradually opened. In such constructions, the valve normally opens in the direction of the inlet water pressure and closes against such pressure. When the outlet from the tank is finally closed and the water passes through the valve and into the tank from the inlet pipe, the float gradually moves upwardly with a rising water level and as it does, the valve gradually closes. When the water level reaches its normal high point in the tank, the float will be at its uppermost position and the valve is closed. When the tank is not flushed for a considerable time, some evaporation and loss of water in the tank tanks place and the water level is lowered a small amount and the float is lowered sufficiently to open the valve slightly and permit water from the inlet pipe to replenish the water supply in the tank.

The present invention relates to a toilet flush tank and to a water supply ballcock valve assembly which utilizes two valves, each having a free floating ball element, which is placed below the valve seat in the water line so that the valves are automatically closed unless the floating balls are mechanically pushed off of the valve seats.

Prior U.S. patents relating to water valves for toilets can be seen in the Nasser U.S. Pat. No. 4,335,741, for a fluid level controller for a water supply tank which mounts the floatation element adjustably along the length of a rod and in a direction perpendicular to the length of the rod using a common clamping element on the rod. The valve element is positioned below the valve seat where it is raised into position and pushed out of position in the operation of the valve. The Kryzer U.S. Pat. No. 2,935,081, is an improvement to a float valve mechanism for use in water softening devices for controlling the flow of liquid to and from a tank. The Flieder U.S. Pat. No. 3,024,799, is a toilet tank inlet valve which uses a free ball valve element free floating in the housing. The Imler U.S. Pat. No. 4,312,083, is a flush valve for a toilet which operates the valve element from beneath the valve seat. The Wilson U.S. Pat. No. 4,461,453, is a valve for a fluid system which directly activates a ball element by a cam lobe of a cam member and a ball valve instead of utilizing additional links between the cam lobe and the ball member.

The Drown U.S. Pat. No. 2,375,406, is a non-overfill device for use in storage batteries and includes a floating ball valve floating in a liquid in one of the battery cells. The Whitlock, Jr. U.S. Pat. No. 2,716,422, is for a float valve in which the float is connected by a stem directly to a valve disc and in which the rising water lifts the float in the valve disc against a valve seat. The Brown et al. U.S. Pat. No. RE 30,427, shows a cam actuated valve element for limiting the flow of liquid petroleum gas into a tank. The Roosa U.S. Pat. No. 4,842,011, is a flushing system for use in toilets and which uses a two-stage valve using inlet line pressure for operating the two stages. The Downin U.S. Pat. No. 3,110,036, is a flush tank assembly which uses a lifting ball and a ballcock assembly driven by an eccentric to drive the ball against a valve seat. The Martin et al. U.S. Pat. No. 2,756,769, is for a ballcock for a flush tank in which the float member is raised and lowered by the water level in the tank so that the movement of the float opens and closes a valve in the water inlet pipe.

The present invention provides for a ballcock assembly which includes a pair of valve assemblies in which the water pressure drives a free floating valve element in each case against the valve seat. The first valve is always maintained open when the ballcock valve assembly is attached thereto while the ballcock assembly valve is operated by a float rotating a cam to push the free floating ball away from the valve seat to allow the flush tank to fill with water to a predetermined level. A float drop pin prevents the float from dropping so it cannot reopen to full flow. For the float to rise above the pin, it had to occur from a seat leak allowing water to flow over the overflow tube. This hang up will notify the user that the ballcock is leaking because it will not fill at full flow as long as the float is hung up on the drop pin.

SUMMARY OF THE INVENTION

A toilet having a water inlet valve apparatus has a flush tank with a water inlet tube connecting from a water source into the flush tank. A water cutoff is attached to the water inlet tube and has a valve seat in a floating valve element positioned in the water inlet tube to seat in the valve seat responsive to water in the water inlet tube so that the water is cut off from entering the toilet tank when the valve element is seated in the valve seat. A removably attached ballcock valve assembly is removably attached to the water cutoff valve and water inlet tube and has a valve opening member positioned to hold the floating valve element in the water cutoff valve from the valve seat when the ballcock valve is attached to the water cutoff valve. Removing the ballcock valve from the water cutoff valve closes the water cutoff valve and stops the flow of water into the tank from the water inlet tube. The ballcock valve includes a floating valve element mounted in the valve body beneath a valve seat so that water from the inlet valve pushes the floating valve element into the valve seat to cut off the water entering the flush tank. A float is mounted to a pair of movable arms which are connected to a cam positioned over the valve seat of the ballcock valve assembly such that the falling float will rotate the cam to push the floating valve element off the valve seat to allow the filling of the flush tank.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figures 1, 2:
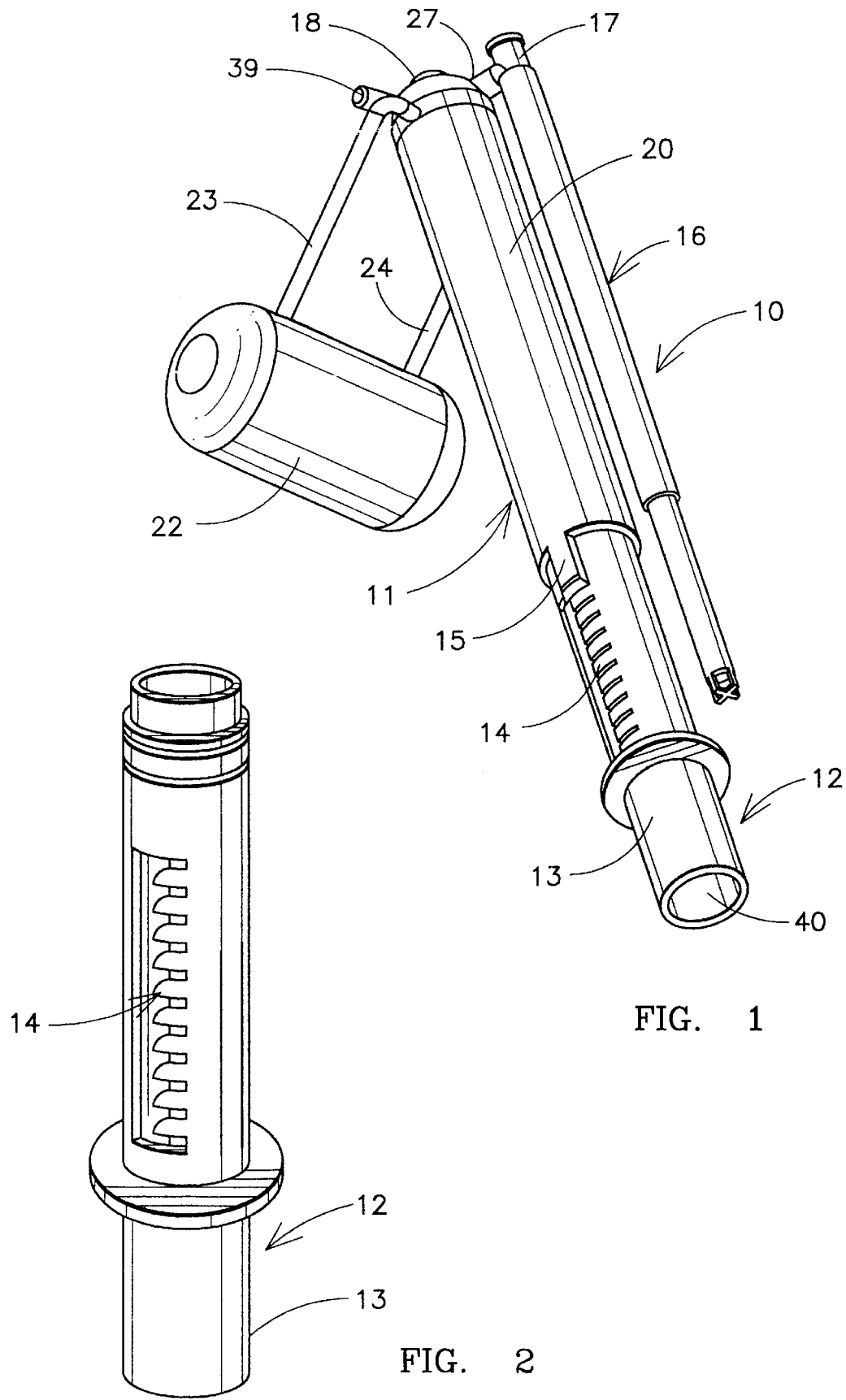
FIG. 1 is a perspective view of a water inlet valve in accordance with the present invention.
FIG. 2 is a perspective of the height adjustment tube of FIG. 1.
Figure 3:
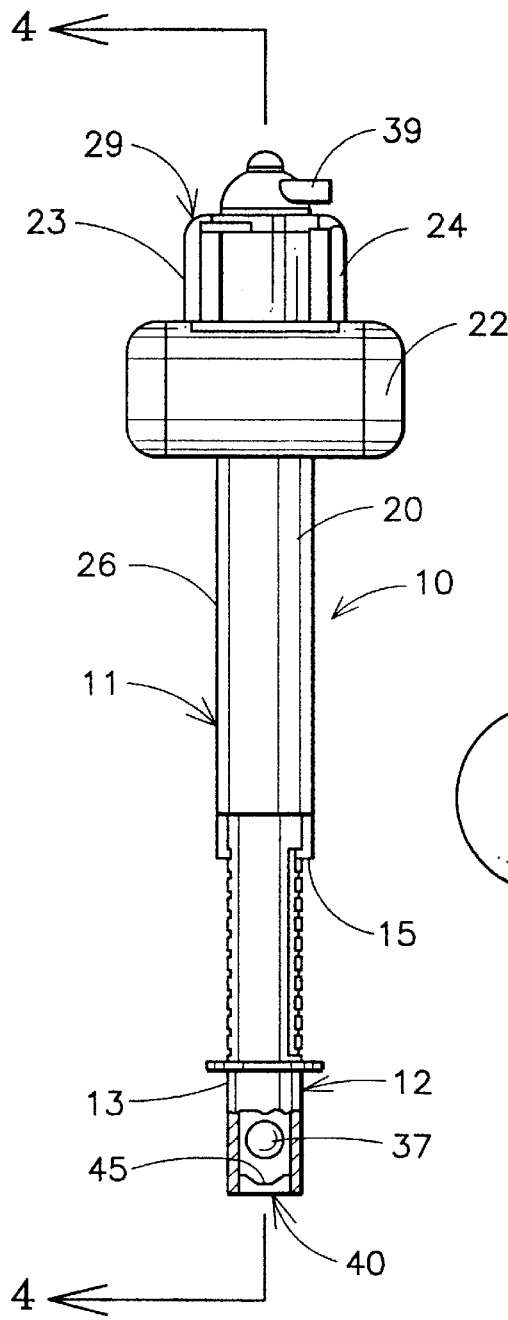
FIG. 3 is a front elevation of the water inlet valve of FIG. 1.
Figure 4:
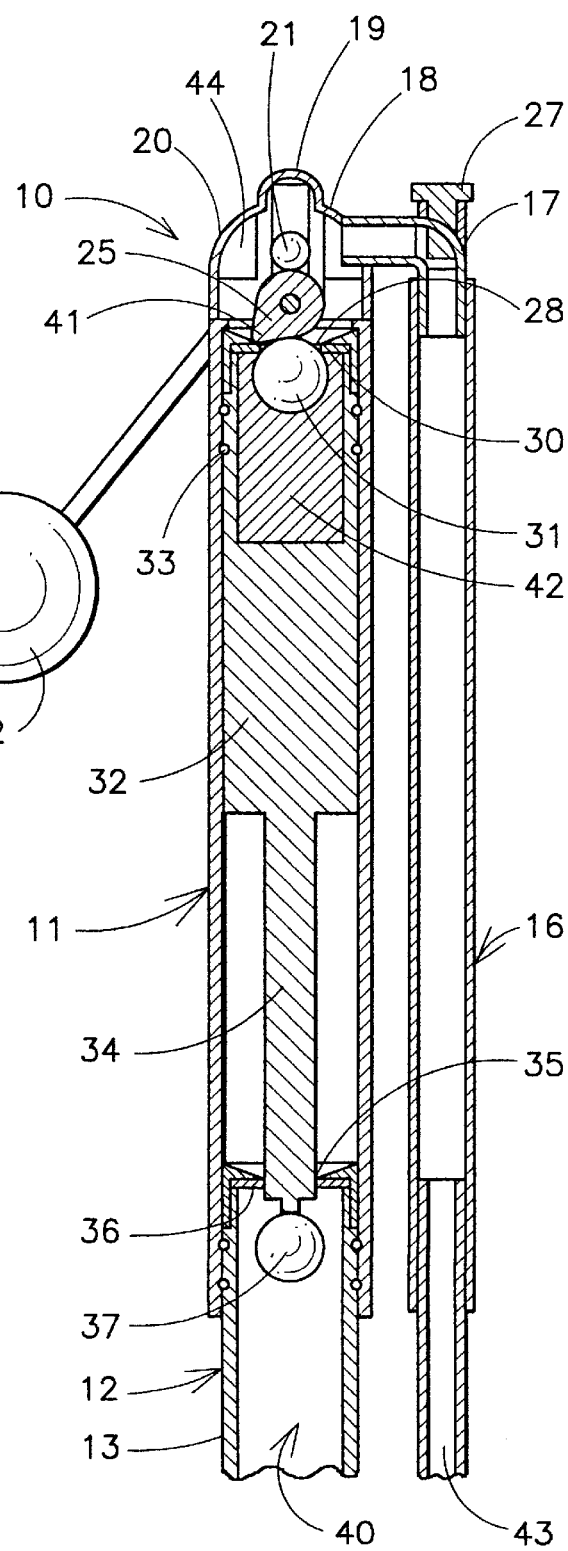
FIG. 4 is a sectional view taken on the line 4—4 of FIG. 3.

Referring to the drawings, FIGS. 1–4, a water inlet or ballcock valve 10 is shown having a ballcock valve assembly 11 having a water inlet valve 12 which includes an opening 13 which connects to the water inlet of a toilet flush tank. The water inlet is, in turn, connected through a shut off valve to a water supply. The water inlet valve 12 has a body 13 and a plurality of height adjusting tabs 14 forming grooves for the locking pawl 15 on the ballcock valve 11 to lock the ballcock 11 in any desired position along the length of the height adjusting tabs 14. The ballcock valve 11 has a telescoping fill tube 16 connected to an ELL connector 17 which connects to a cap 18 attached to the body 20 of the ballcock valve 11. The cap 18 has an air port 19 for viewing into the ballcock valve and acts as a siphon block. The port 19 is covered by a floating ball 21 when the cap is filled with water. A ballcock float 22 has a pair of float arms 23 and 24 which are connected to a cam 25. The body 20 can also be seen as having a water level marker 26 on the side thereof so that the water level in the flush tank can be readily determined. A flow adjustment screw 27 is threaded into the ELL 17 for controlling the flow into the fill tube 16. A valve seat 28 has a seal 30 for receiving the floating valve element or ball 31 thereagainst. An internally adjustable tube 32 has a pair of O-ring seals 33 at one end and has an extendable arm 34 extending therefrom. The adjustable arm 32 is positioned in the housing 20 of the ballcock valve and extends into the tube 13 and through the water inlet valve seat 35 and sealing washer 36 where it can push against a free floating valve element 37 which freely floats in the tube 13 of the water inlet valve 12.

In operation, the water from the flush tank water inlet enters the open end 40 of the water inlet valve 12 where the water maintains the water inlet floating valve element 37 against the protruding arm 34 of the adjustable tube 32 to keep the floating ball 37 off of the valve seat 35 and sealing washer 36. The water then flows through or past the tube 32 inside the tube 20 and drives the valve element 31 against the sealing washer 30 and valve seat 28 to block the water from entering the flush tank. As long as the valve float 22 is in a raised position, raising the arms 23 and 24 and rotating the cam 25 opening lobe 41 away from the ball 31. As the float 22 drops, the arms 23 and 24 swing the cam 25 so that the cam lobe 41 pushes the ball 31 into the open cage area 42 to allow the water to flow through the valve seat 30 through the cap 18 and through the elbow 17 and into the fill tube 16 where it exits the fill tube opening 43 into the toilet flush tank. The flow adjustment screw 27 can be adjusted to control the flow passing therethrough while the open air port 19 is open any time there is no water flowing through the ballcock valve but is closed by a floating ball 21 whenever water fills the inside cap area 44.

If the ballcock valve 11 has to be removed from the toilet, the pawl 15 can be loosened from the groove formed by tabs 14 in the water inlet valve assembly and the ballcock valve pulled off the water valve assembly. As the arm 34 is pulled with the ballcock valve, it releases the ball 37 which then seats into the valve seat 35 to prevent the water from the water supply flowing into the toilet while the ball valve is removed without having to activate the shutoff valve. This is especially advantageous in those cases where shutoff valves have not been used for long periods of time and may not work properly. The ball 37 will also seat in the valve seat 45 when the water supply is turned off to prevent the backflow of water into the water supply line. The level of the water in the toilet is adjusted by moving the ballcock valve body 20 telescoping over the tube 12 until the proper level is reached, at which time the pawl 15 locks the ballcock valve body in place in a groove between tabs 14. The water level can be readily determined from the water level marker 26 on the side of the body 20. The float drop prevention pin 29 is attached to the cap 18 where it, with the movement of one of the float arms 23, prevents the float arm from dropping. The float arm 23 slips past the pin 29 which can be slightly flexible or angled upward to prevent the float 22 from dropping when the valve fails to stop leakage if the water fails to shut off in the toilet in the event of a valve failure.

It should be clear at this time that a toilet water inlet system has been provided which advantageously allows for a ballcock assembly to be removed and replaced without turning the toilet shutoff valve off and which utilizes a free floating valve system which is closed by the water pressure from the inlet water. In addition, the valve assembly allows for adjustment for the water level. However, the present invention should not be considered as limited to the forms shown which are to be considered illustrative rather than restrictive.

I claim:

1. A toilet having a water inlet valve apparatus comprising:

a toilet having a flush tank;

a water inlet tube connected from a water source into said flush tank;

a water cutoff valve attached to said water inlet tube and having a valve seat and a floating valve element positioned in said water inlet tube to seat in said valve seat responsive to water in said water inlet tube whereby water is cut off from entering said toilet tank when said valve element is seated in said valve seat; and a ballcock valve removably attached to said water cutoff valve and having a water cutoff valve opening member fixedly attached to said ballcock valve and positioned to hold said water cutoff valve floating valve element away from said water cutoff valve seat when said ballcock valve is attached to said water cutoff valve, whereby removing said ballcock valve and attached water cutoff valve member from said water cutoff valve allows said water cutoff valve to close and stops the flow of water into said flush tank from said water inlet tube.

2. A toilet in accordance with claim 1 in which said float is ball having a specific gravity below the specific gravity of water.

3. A toilet in accordance with claim 1 in which said ballcock valve water cutoff valve opening member is a extension arm extending from said ballcock valve and positioned to push said water cutoff valve floating valve element off said valve seat.

4. A toilet in accordance with claim 1 in which said ballcock valve has a valve seat and floating valve element therein seated by water entering through said water cutoff valve to force said ballcock valve floating valve element into said ballcock valve seat and said ballcock valve has a ballcock float mounted to move said ballcock valve floating valve element from its valve seat responsive to the change in water level in said flush tank.

5. A toilet in accordance with claim 4 in which said water cutoff valve floating valve element is a floating ball.

6. A toilet in accordance with claim 4 in which said ballcock float has a cam attached thereto and rotated by said float moving responsive to the rise and fall of said ballcock float.

7. A toilet in accordance with claim 6 in which said ballcock valve has a cam mounted therein over said floating valve element.

8. A toilet in accordance with claim 7 in which said ballcock valve float is attached to a float arm supporting said float.

9. A toilet in accordance with claim 1 in which said ballcock valve has a sealing cap mounted thereto and said sealing cap has a transparent portion.

10. A toilet in accordance with claim 1 in which said ballcock valve has a transparent side portion having water level marking thereon.

11. A toilet in accordance with claim 1 in which said ballcock valve has a pin position to limit the drop of said float in said toilet tank.

12. A toilet in accordance with claim 1 in which said ballcock valve is adjustably mounted to said water inlet valve for adjusting the water level in said toilet tank.

13. A toilet in accordance with claim 1 in which said water inlet valve opening arm is mounted inside said ballcock valve.

* * * * *